United States Patent
Douglas et al.

(10) Patent No.: US 12,063,242 B2
(45) Date of Patent: Aug. 13, 2024

(54) VULNERABILITY SCANNING OF A REMOTE FILE SYSTEM

(71) Applicant: Tenable, Inc., Columbia, MD (US)

(72) Inventors: Kevin Douglas, Vienna, VA (US); Matthew Wirges, West Bend, WI (US)

(73) Assignee: TENABLE, INC., Columbia, MD (US)

( * ) Notice: Subject to any disclaimer, the term of this patent is extended or adjusted under 35 U.S.C. 154(b) by 0 days.

(21) Appl. No.: 18/191,503

(22) Filed: Mar. 28, 2023

(65) Prior Publication Data

US 2024/0022590 A1    Jan. 18, 2024

Related U.S. Application Data

(63) Continuation of application No. 17/864,905, filed on Jul. 14, 2022, now Pat. No. 11,647,040.

(51) Int. Cl.
*H04L 9/40* (2022.01)
*G06F 21/62* (2013.01)

(52) U.S. Cl.
CPC ...... *H04L 63/1433* (2013.01); *G06F 21/6209* (2013.01)

(58) Field of Classification Search
CPC .................. H04L 63/1433; G06F 21/6209
See application file for complete search history.

(56) References Cited

U.S. PATENT DOCUMENTS

| | | | | |
|---|---|---|---|---|
| 8,667,273 B1 * | 3/2014 | Billstrom | ............ | G06F 21/6209 713/165 |
| 10,454,950 B1 * | 10/2019 | Aziz | ................... | H04L 63/1425 |
| 10,740,464 B2 * | 8/2020 | Smith | ................... | G06F 21/577 |
| 11,012,326 B1 * | 5/2021 | Campbell | ............... | H04L 63/20 |
| 2013/0111547 A1 * | 5/2013 | Kraemer | ............. | H04L 63/1433 726/1 |
| 2014/0013436 A1 * | 1/2014 | Deraison | ............. | H04L 63/1433 726/25 |
| 2016/0006766 A1 * | 1/2016 | Joo | ......................... | G06F 21/53 726/1 |
| 2016/0344749 A1 * | 11/2016 | McAlear | ................. | G06F 21/60 |

(Continued)

FOREIGN PATENT DOCUMENTS

| | | | | | |
|---|---|---|---|---|---|
| CN | 1183841 A | * | 6/1998 | ............. | G06F 21/00 |
| CN | 107743701 B | * | 12/2020 | ........... | G06F 16/285 |

(Continued)

*Primary Examiner* — Sarah Su
(74) *Attorney, Agent, or Firm* — Muncy, Geissler, Olds & Lowe, P.C.; Daniel Podhajny

(57) ABSTRACT

In an embodiment, a vulnerability scanner component determines one or more target software objects of a remote file system for a vulnerability scan, and performs, via a file system application programming interface (API), a file system decoding procedure based on information associated with the remote file system to determine a subset of disk blocks of the remote file system that comprise the one or more target software objects. The vulnerability scanner component transmits, to a remote device, a read request associated with the subset of disk blocks, and obtains, in response to the read request, the subset of disk blocks (e.g., rather than a full disk image). The vulnerability scanner component extracts the one or more target software objects from the subset of disk blocks, and performs the vulnerability scan on the extracted one or more target software objects.

28 Claims, 9 Drawing Sheets

(56) References Cited

U.S. PATENT DOCUMENTS

| | | | |
|---|---|---|---|
| 2017/0272472 A1* | 9/2017 | Adhar | G06F 21/602 |
| 2018/0041539 A1* | 2/2018 | Htay | H04L 63/1433 |
| 2018/0048665 A1* | 2/2018 | Shulman | H04L 63/1425 |
| 2019/0327272 A1* | 10/2019 | Narayanaswamy | G06F 16/285 |
| 2020/0059487 A1* | 2/2020 | Malik | H04L 9/0643 |
| 2020/0177620 A1* | 6/2020 | Czarny | G06F 21/577 |
| 2020/0272734 A1* | 8/2020 | Tora | H04L 63/1425 |
| 2020/0326892 A1* | 10/2020 | Caruana | G06F 9/45558 |
| 2024/0056482 A1* | 2/2024 | Ignatius | H04L 63/1433 |

FOREIGN PATENT DOCUMENTS

| | | | | |
|---|---|---|---|---|
| TW | 1720932 B | * | 3/2021 | G06F 21/56 |
| WO | WO-03005245 A2 | * | 1/2003 | G06F 11/1461 |

* cited by examiner

VULNERABILITY SCANNING OF A REMOTE FILE SYSTEM

CROSS-REFERENCE TO RELATED APPLICATIONS

The present application for patent claims priority to U.S. Non-Provisional patent application Ser. No. 17/864,905, entitled "VULNERABILITY SCANNING OF A REMOTE FILE SYSTEM," filed Jul. 14, 2022, which is assigned to the assignee hereof and expressly incorporated herein by reference in its entirety.

TECHNICAL FIELD

The various aspects and embodiments described herein generally relate to vulnerability scanning of a remote file system.

BACKGROUND

Vulnerability scanning of a target computer's file system typically requires a scanner agent to be installed onto the target computer, a network-based scanner to remotely scan the target computer, or a disk volume (or disk image) to be created from a snapshot of the target computer's file system and mounted on a surrogate computer to perform the vulnerability scan.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a vulnerability scanner component includes determining one or more target software objects of a remote file system for a vulnerability scan; performing, via a file system application programming interface (API), a file system decoding procedure based on information associated with the remote file system to determine a subset of disk blocks of the remote file system that comprise the one or more target software objects; transmitting, to a remote device, a read request associated with the subset of disk blocks; obtaining, in response to the read request, the subset of disk blocks; extracting the one or more target software objects from the subset of disk blocks; and performing the vulnerability scan on the extracted one or more target software objects.

In an aspect, a vulnerability scanner component includes a memory; and at least one processor communicatively coupled to the memory, the at least one processor configured to: determine one or more target software objects of a remote file system for a vulnerability scan; perform, via a file system application programming interface (API), a file system decoding procedure based on information associated with the remote file system to determine a subset of disk blocks of the remote file system that comprise the one or more target software objects; transmit, to a remote device, a read request associated with the subset of disk blocks; obtain, in response to the read request, the subset of disk blocks; extract the one or more target software objects from the subset of disk blocks; and perform the vulnerability scan on the extracted one or more target software objects.

In an aspect, a non-transitory computer-readable medium storing computer-executable instructions that, when executed by a vulnerability scanner component, cause the vulnerability scanner component to: determine one or more target software objects of a remote file system for a vulnerability scan; perform, via a file system application programming interface (API), a file system decoding procedure based on information associated with the remote file system to determine a subset of disk blocks of the remote file system that comprise the one or more target software objects; transmit, to a remote device, a read request associated with the subset of disk blocks; obtain, in response to the read request, the subset of disk blocks; extract the one or more target software objects from the subset of disk blocks; and perform the vulnerability scan on the extracted one or more target software objects.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
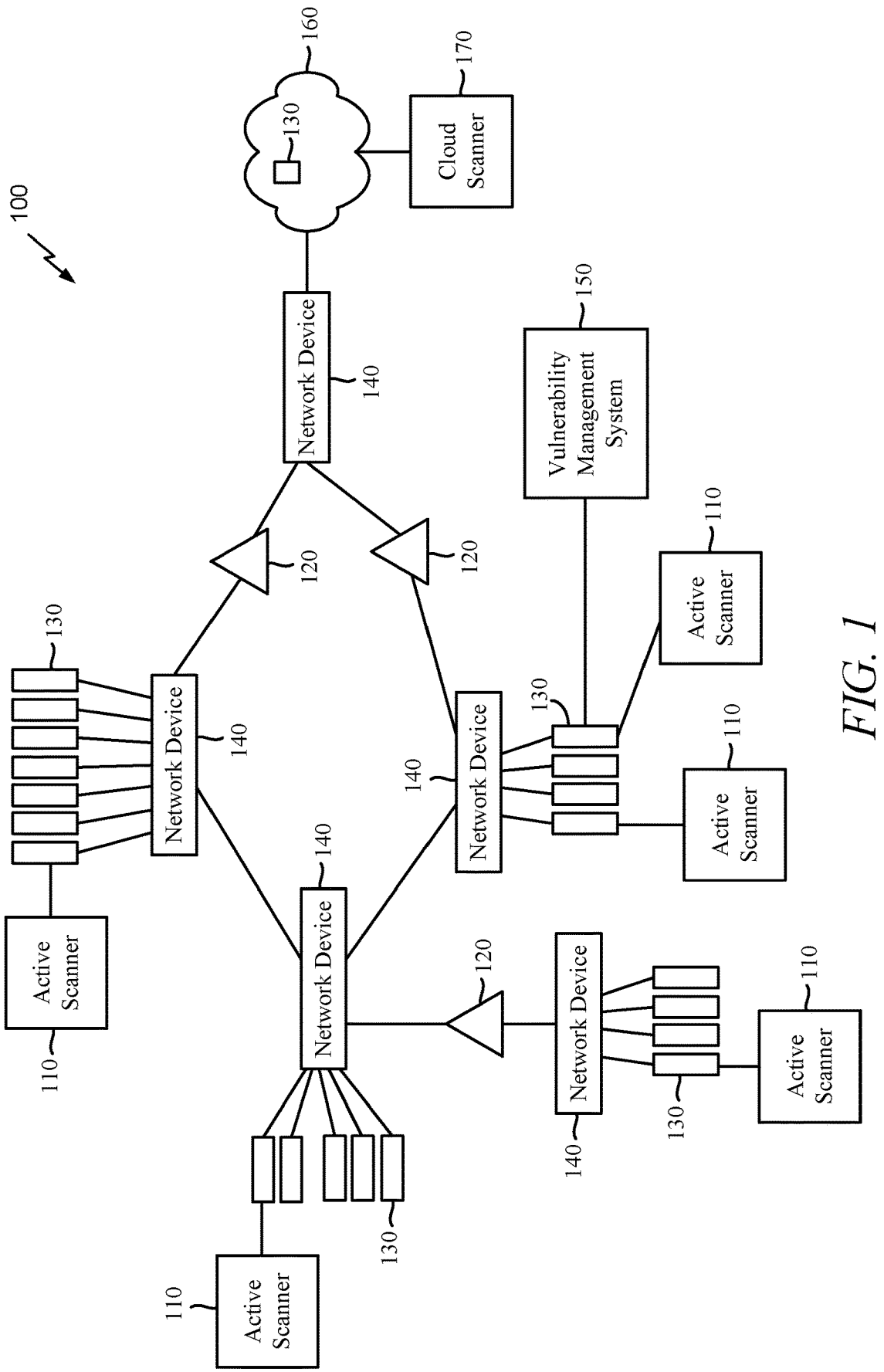
FIG. 1 illustrates an exemplary network having various assets that can be managed using a vulnerability management system, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof.

Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived asses like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
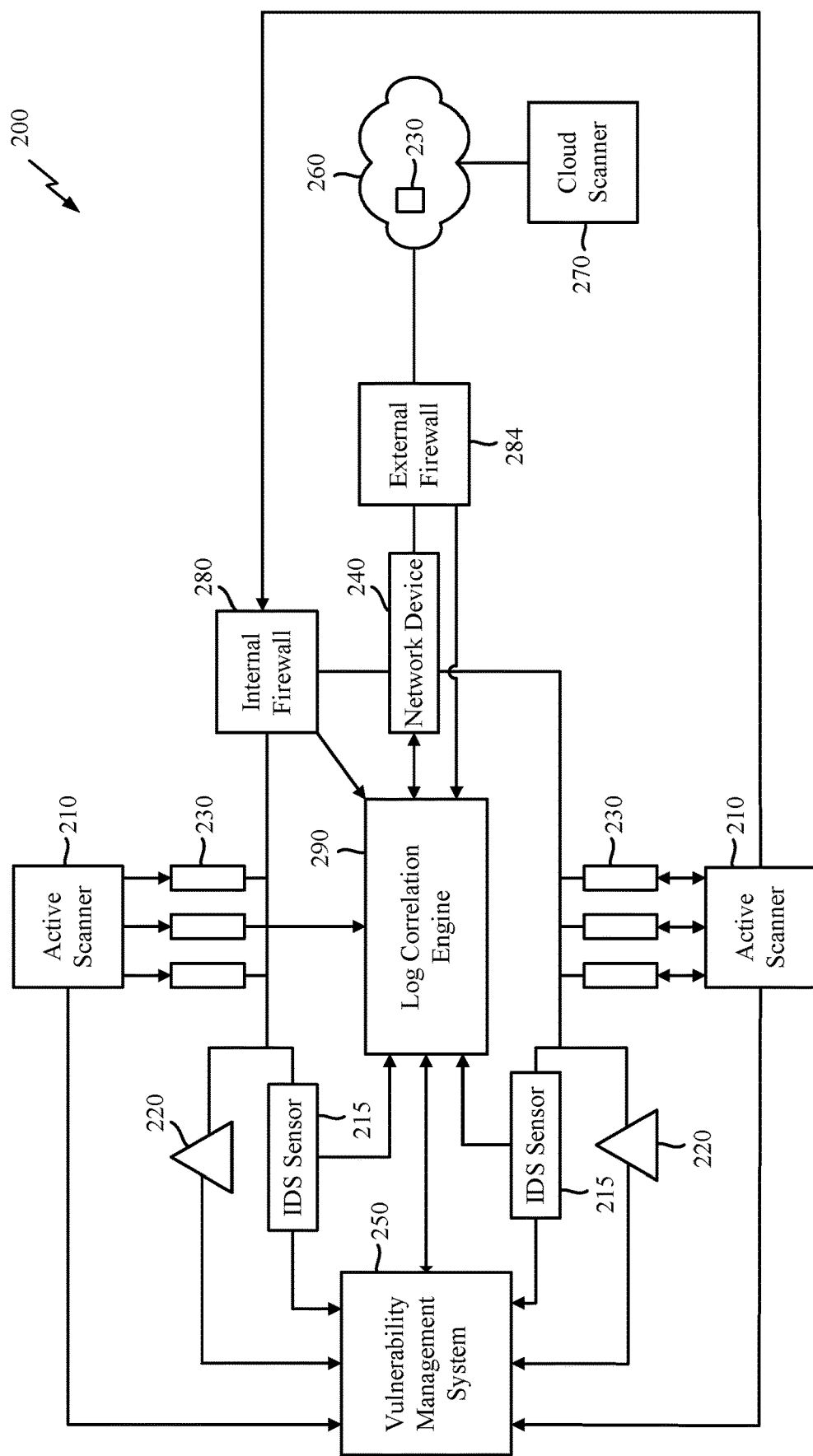
FIG. 2 illustrates another exemplary network having various assets that can be managed using a vulnerability management system, according to various aspects.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Security auditing applications typically display security issues (such as vulnerabilities, security misconfigurations, weaknesses, etc.) paired with a particular solution for that given issue. Certain security issues may share a given solution, or have solutions which are superseded or otherwise rendered unnecessary by other reported solutions. Embodiments of the disclosure relate to improving an efficiency by which security issues are reported, managed and/or rectified based on solution supersedence.

In accordance with a first embodiment, when working with security reporting datasets with sparse metadata available, the reported solutions for each security issue are combined, and various "rulesets" are applied against the combined solutions to de-duplicate them and remove solutions that have been superseded by other solutions. As used herein, a ruleset is a set of rules that govern when a solution is to be removed or merged with another and how that merge is to be accomplished. In an example, when solution texts not matching a given ruleset are discovered they are flagged for manual review. Examples of rules that may be included in one or more rulesets are as follows:

If there is more than one matching solution in the solution list, remove all but one of those solutions.

For solutions matching "Upgrade to <product> x·y·z" where x, y, and z are integers, select a single result with the highest x·y·z value (comparing against x first, then y, then z).

For solutions matching "Apply fix <fix> to <product>", create a new combined solution where <fix> for each solution is concatenated into a comma separated list for a given <product>.

In accordance with a second embodiment, when working with datasets with metadata available that have an identifier that allows grouping of solutions based on product (e.g., common product enumeration (CPE)) and timestamp information on when a fix has become available, the solutions for each group can be filtered with only display the latest "top level" solution for each group being displayed. In an example, the first and second embodiments can be implemented in conjunction with each other to produce a further refined solution set.

As used herein, a "plug-in" contains logic and metadata for an individual security check in a security auditing application. A plugin may check for one or more mitigations/fixes and flag one or more individual security issues. CPE is a standardized protocol of describing and identifying classes of applications, operating systems, and hardware devices present among an enterprise's computing assets. CPE identifiers contain asset type information (OS/Hardware/Application), vendor, product, and can even contain version information. An example CPE string is "cpe:/o:microsoft: windows_vista:6.0:sp1", where "/o" stands for operating system, Microsoft is the vendor, windows_vista is the product, major version is 6.0, and minor version is SP1. Further, a common vulnerabilities and exposures (CVE) identifier is an identifier from a national database maintained by NIST/Mitre which keeps a list of known vulnerabilities and exposures. An example identifier would be "CVE-2014-6271" which corresponds to the "ShellShock" vulnerability in the database.

In accordance with one implementation of the second embodiment, solutions (or solution 'texts') may first be grouped together based on the CPEs in the plugins they were reported in. The solutions are then sorted by the patch publication date from the plugins which they were sourced from. Solutions containing text that matches a pattern that indicates that the solution is likely a patch recommendation can all be removed from the group except the solution associated with the most recent patch. In this manner, patches with identifiers that cannot be easily sorted (e.g., patches with non-numerical identifiers) and/or for which no ruleset pertains in accordance with the first embodiment can be filtered out from the solution set. In some implementations, additional ruleset-based filtering from the first embodiment can also be applied, to filter out (or de-duplicate) additional duplicate solution information.

In accordance with a third embodiment, a security auditing application may evaluate further metadata in the solution report results that is added based upon asset-specific information (e.g., such as individual patches installed, which mitigations and patches are missing, what individual software installations are installed, patch supersedence information, the relationship between the mitigations/patches and security issues, etc.).

Figure 3:
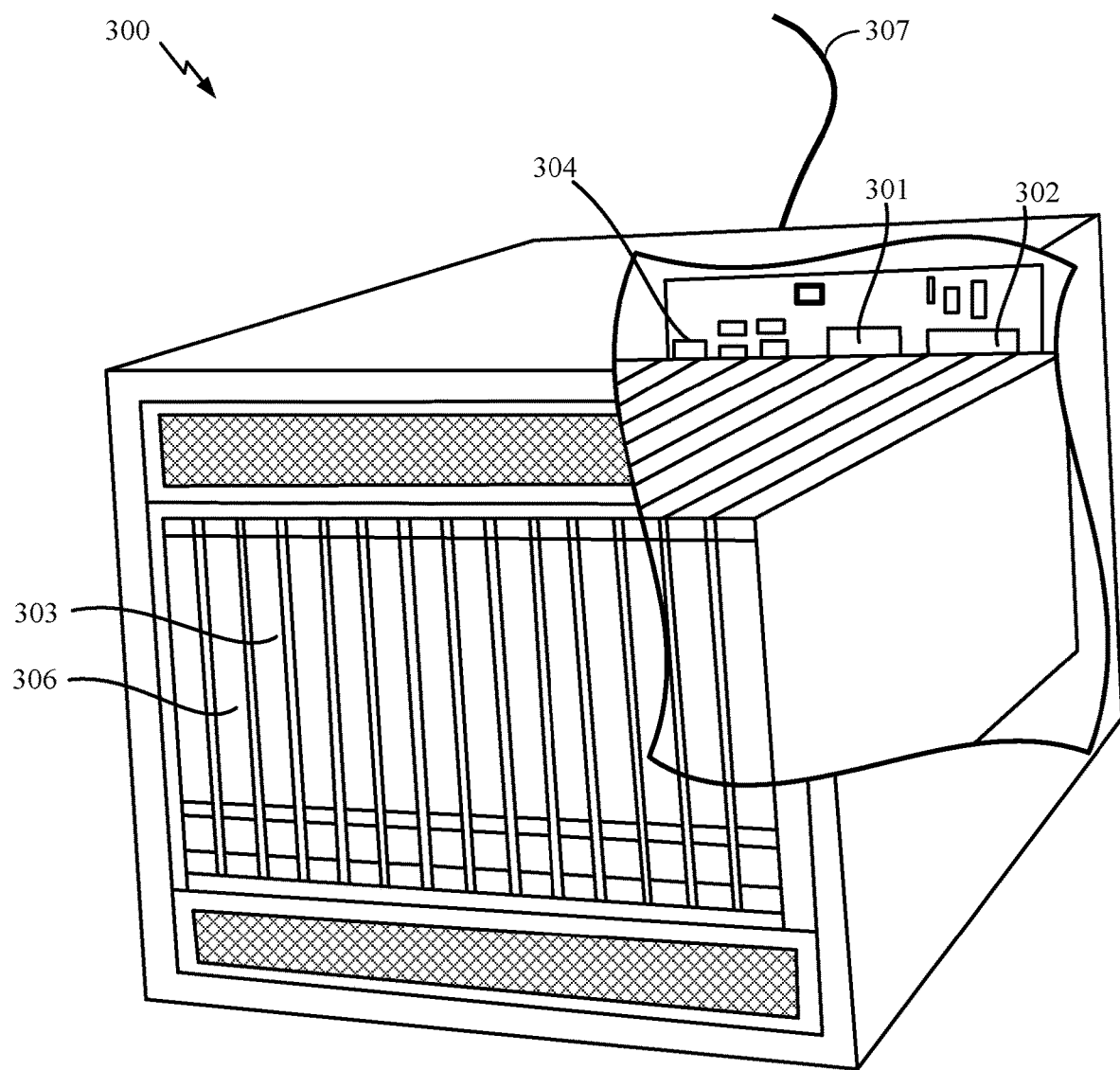
FIG. 3 illustrates an exemplary server, according to various aspects.

The various embodiments may be implemented on any of a variety of commercially available server devices, such as server 300 illustrated in FIG. 3. In an example, the server 300 may correspond to one example configuration of a server on which a vulnerability scanner component may execute, which in certain implementations may be included as part of the vulnerability management system 150 of FIG. 1 or the vulnerability management system 250 of FIG. 2. In FIG. 3, the server 300 includes a processor 301 coupled to volatile memory 302 and a large capacity nonvolatile memory, such as a disk drive 303. The server 300 may also include a floppy disc drive, compact disc (CD) or DVD disc drive 306 coupled to the processor 301. The server 300 may also include network access ports 304 coupled to the processor 301 for establishing data connections with a network 307, such as a local area network coupled to other broadcast system computers and servers or to the Internet.

Figure 4:
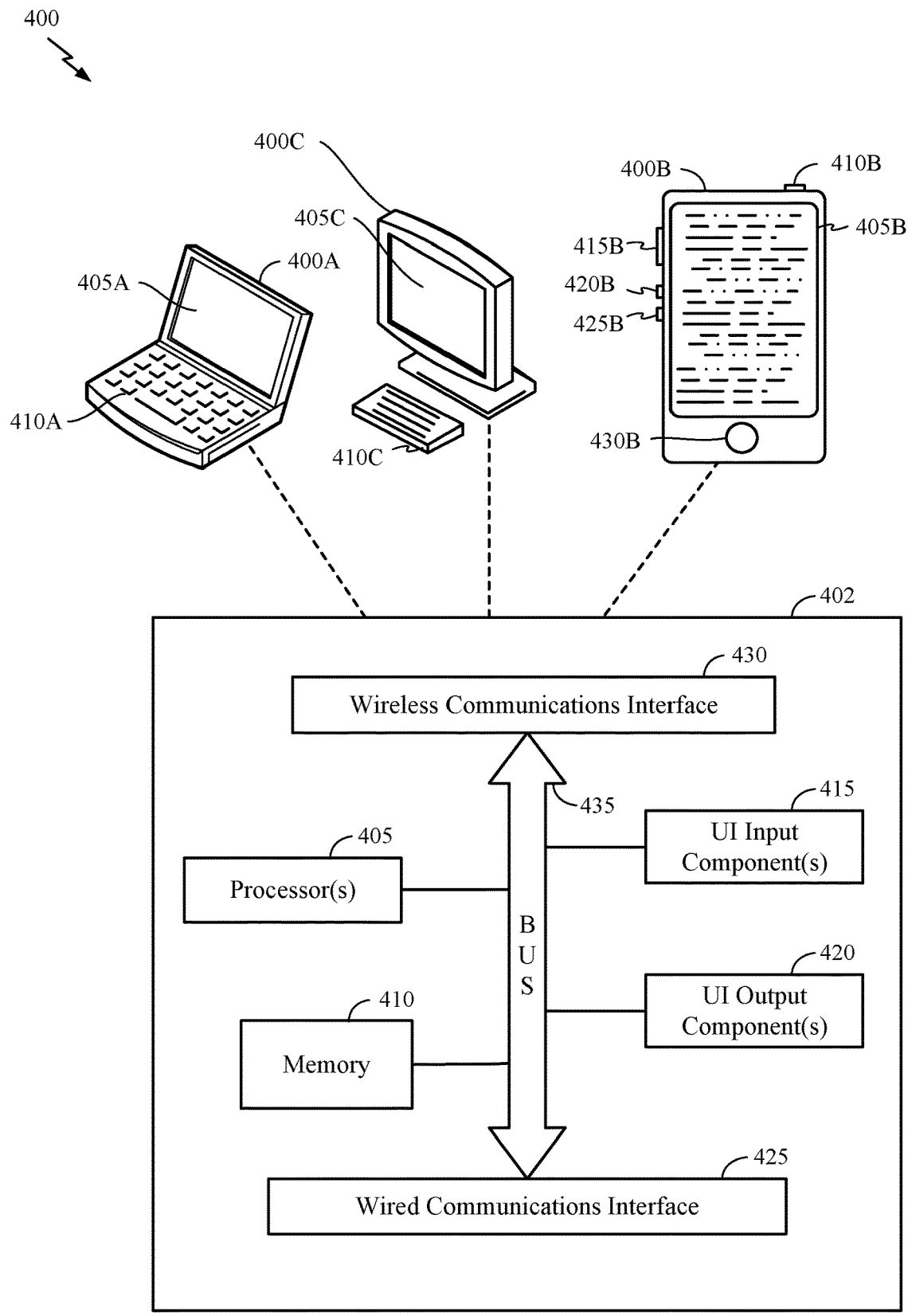
FIG. 4 illustrates exemplary user equipments (UEs), according to various aspects.

FIG. 4 illustrates examples of user equipments (UEs) in accordance with embodiments of the invention. In an aspect, one or more of the UEs depicted in FIG. 4 may be used as a vulnerability scanner component. In other aspects, one or more of the UEs depicted in FIG. 4 may be used to log into a server such as the server 300 of FIG. 3, in which case the server 300, the respective UE, or a combination thereof may correspond to the vulnerability scanner component.

Referring to FIG. 4, UE 400 includes one or more processors 405 (e.g., one or more ASICs, one or more digital signal processors (DSPs), etc.) and a memory 410 (e.g., RAM, ROM, EEPROM, flash cards, or any memory common to computer platforms). The UE 400 also optionally includes one or more UI input components 415 (e.g., a keyboard and mouse, a touchscreen, a microphone, one or more buttons such as volume or power buttons, etc.) and one or more UI output components 420 (e.g., speakers, a display screen, a vibration device for vibrating the UE 400, etc.). In an example, the UI input components 415 and UI output components 420 are optional because the UE 400 need not interface with a local user in all implementations.

The UE 400 further includes a wired communications interface 425 and a wireless communications interface 430. In an example, the wired communications interface 425 may be optional (e.g., UE 400 may be configured for wireless communication only). In an example embodiment, if made part of the UE 400, the wired communications interface 425 can be used to support wired local connections to peripheral devices (e.g., a USB connection, a mini USB or lightning connection, a headphone jack, graphics ports such as serial, VGA, HDMI, DVI or DisplayPort, audio ports, and so on) and/or to a wired access network (e.g., via an Ethernet cable or another type of cable that can function as a bridge to the wired access network such as HDMI v1.4 or higher, etc.). In another example embodiment, the wireless communications interface 430 includes one or more wireless transceivers for communication in accordance with a local wireless communications protocol (e.g., WLAN or WiFi, WiFi Direct, Bluetooth, etc.) and/or one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, LTE, 4G, 5G LTE, 5G NR or other protocols that may be used in a terrestrial wireless communication subscriber network). The various components 405-430 of the UE 400 can communicate with each other via a bus 435.

Referring to FIG. 4, UE 400A is illustrated as a laptop computer, UE 400C, UE 400B is illustrated as a touchscreen device (e.g., a smart phone, a tablet computer, etc.) and UE 400C is illustrated as a desktop computer.

As shown in FIG. 4, UE 400A includes a display screen 405A and an integrated keyboard 410A. An external casing of UE 400B is configured with a touchscreen display 405B, peripheral buttons 410B, 415B, 420B and 425B (e.g., a power control button, a volume or vibrate control button, an airplane mode toggle button, etc.), at least one front-panel button 430B (e.g., a Home button, etc.), among other components, as is known in the art. While not shown explicitly as part of UE 400B, the UE 400B can include one or more external antennas and/or one or more integrated antennas that are built into the external casing of UE 400B, including but not limited to WiFi antennas, cellular antennas, satellite position system (SPS) antennas (e.g., global positioning system (GPS) antennas), and so on. UE 400C includes a display screen 405C and an external keyboard 410C.

While internal components of UEs such as the UEs 400A-400C can be embodied with different hardware configurations, a basic high-level UE configuration for internal hardware components is shown as platform 402 in FIG. 4.

Vulnerability scanning of a target computer's file system typically requires a scanner agent to be installed onto the target computer, a network-based scanner to remotely scan the target computer, or a disk volume (or disk image) to be created from a snapshot of the target computer's file system and mounted on a surrogate computer to perform the vulnerability scan. Each of these existing options have distinct disadvantages.

For example, installing a vulnerability scanner agent directly on a target computer for active scanning may be intrusive and cumbersome. First of all, installing a vulnerability scanner agent directly on a target computer requires software to be physically installed on each target. In some designs, this software must be updated regularly as new releases of the vulnerability scanner agent are released. During a scanning cycle, the vulnerability scanning agent competes for system resources (e.g., CPU, memory, disk and network) with the target computer. This competition for resources may result in a noticeable degradation in performance for the core applications running on the target computer (i.e., the user experiences slow response times and is negatively impacted). Additionally, while the target computer is offline (either physically powered off, in sleep mode, or simply disconnected from the network), no vulnerability scanning results can be captured and forwarded to back-end reporting systems. In other words, if the target computer is offline, no visibility exists regarding the target computer's vulnerability posture.

Performing network-based (or remote) vulnerability scanning of target computers eliminates issues regarding the need to install and maintain scanner agents on each target, but it shares many of the disadvantages. Similar to the agent-based approach, the target computer's performance can be impacted during the scan cycle as the network scanner probes to make vulnerability detections. Additionally, the network scanner requires administrator credentials in order to have full visibility into the target being scanned, or the network scanner can scan without these credentials and have a more limited view of the target's vulnerability posture. Either mode (with or without credentials) has its disadvantages (credential management issues vs limited visibility). Lastly, the network scanner is blind to vulnerabilities for any target computer that is offline during the scan cycle.

Creating a disk volume (or image) from a snapshot of the target computer and mounting the disk image onto a surrogate computer for scanning (referred to as "side scanning") eliminates impacting the performance of each target being scanned because the scan is performed without using the target computer's system resources, as described below with respect to FIG. 5.

Figure 5:
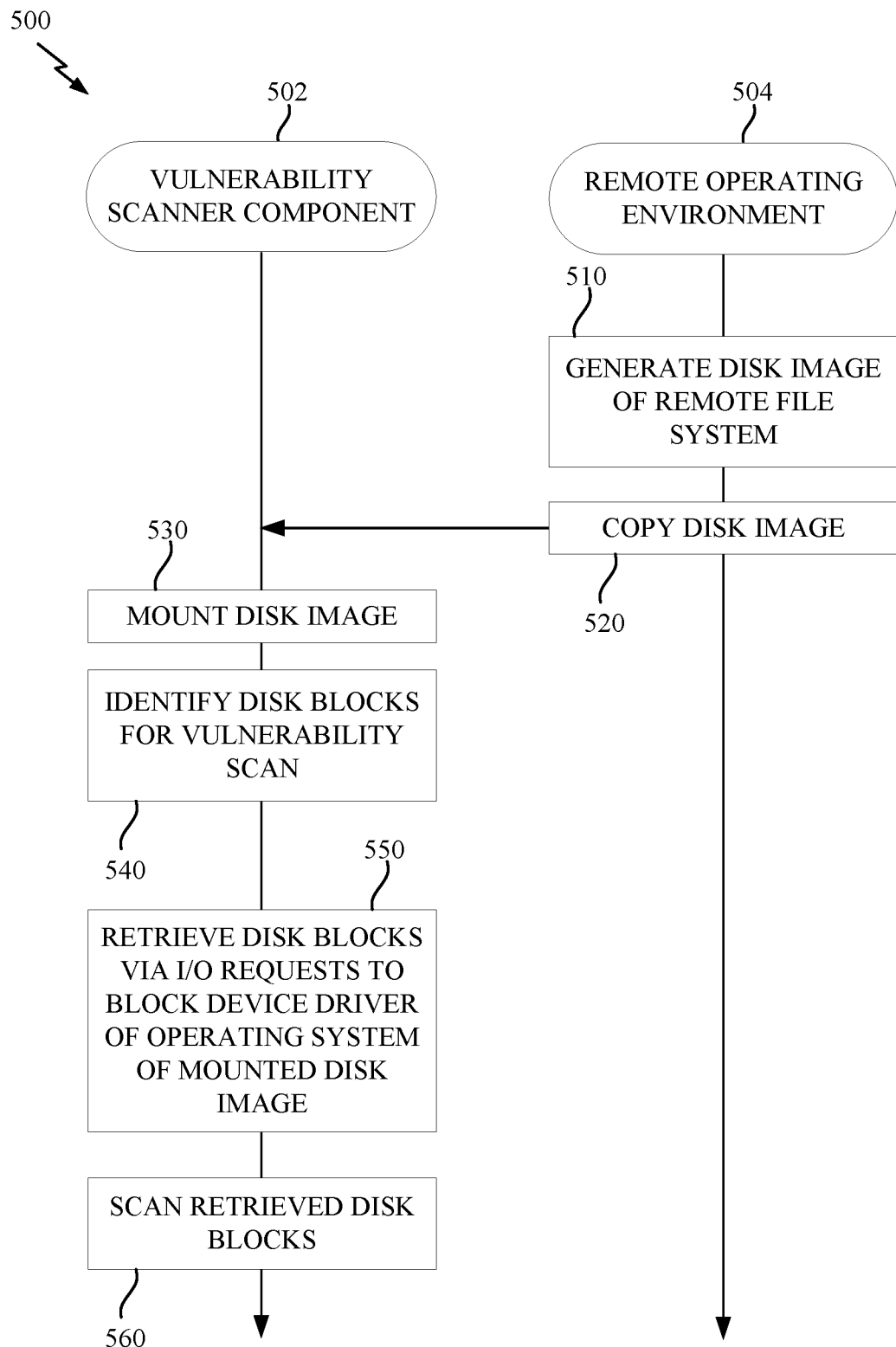
FIG. 5 illustrates a vulnerability scanning process in accordance with embodiments of the disclosure.

FIG. 5 illustrates a disk image-based scanning process 500, in accordance with aspects of the disclosure. The disk image-based scanning process 500 involves interaction between a vulnerability scanner component 502 (e.g., vulnerability management system 150 or 250) and a remote operating environment 504 (e.g., a target computer comprising a remote file system to be scanned, a cloud service such as Amazon Web Services (AWS) or Microsoft Azure or Google Cloud that hosts the target computer comprising the remote file system to be scanned, etc.).

Referring to FIG. 5, at 510, the remote operating environment 504 generates a disk image of a snapshot of a remote file system (e.g., X-Methods file system (XFS), extension 4 (EXT4), New Technology File System (NTFS), etc.) of a target computer. In some designs, the remote operating environment 504 (and remote file system) may be physically (e.g., geographically) remote from the vulnerability scanner component 502, the remote operating environment 504 (and remote file system) may be separated from the vulnerability scanner component 502 by one or more firewalls or communication links irrespective of physical/geographic distance, or a combination thereof. At 520, the disk image is copied over into an operating environment of the vulnerability scanner component 502. As will be appreciated, the disk image may be large, so the copying operation of 520 may be fairly time-consuming and resource-intensive. At 530, the disk image is mounted. If the disk image is encrypted, suitable encryption keys may also be shared by the remote operating environment 504 with the vulnerability scanner component 502 to facilitate the mounting at 530. Moreover, a condition of the mounting at 530 is that the vulnerability scanner component 502 comprises a computer capable of reading the remote file system (e.g., a XFS-capable module if the remote file system is XFS, an EXT4-capable module if the remote file system is EXT4, an NTFS-capable module if the remote file system is NTFS, etc.). At 540, the vulnerability scanner component 502 identifies disk blocks (e.g., disk blocks corresponding to registry files, etc.) for a vulnerability scan. At 550, the vulnerability scanner component 502 retrieves the disk blocks via I/O requests to a block device driver of an operating system (e.g., Linux, Windows, iOS, Android, etc.) of the mounted disk image. At 560, the vulnerability scanner component 502 scans the retrieved disk blocks.

While not illustrated in FIG. 5 expressly, the disk image-based scanning process 500 may further include destroying the copies of the snapshot/image and providing evidence of destruction back to the customer. Also, costs and security concerns are possibly incurred regarding any additional copying and marshaling of disk images between the target location and the scanner location.

Aspects of the disclosure are thereby directed to performing the vulnerability scan of at least part of a target computer's remote file system (e.g., directly or via a disk image) via targeted read requests associated with particular disk blocks of the remote file system. In some designs, such aspects may be performed without copying, creating and/or mounting a disk volume to any surrogate computer, in contrast to FIG. 5. Instead, in some aspects, the file system decoding simply requires read access (and decrypt access as needed) to a disk image of a snapshot of the remote file system. Such aspects may provide various technical advantages, such as reducing scan times, network resource utilization, improving security, and so on.

Figure 6:
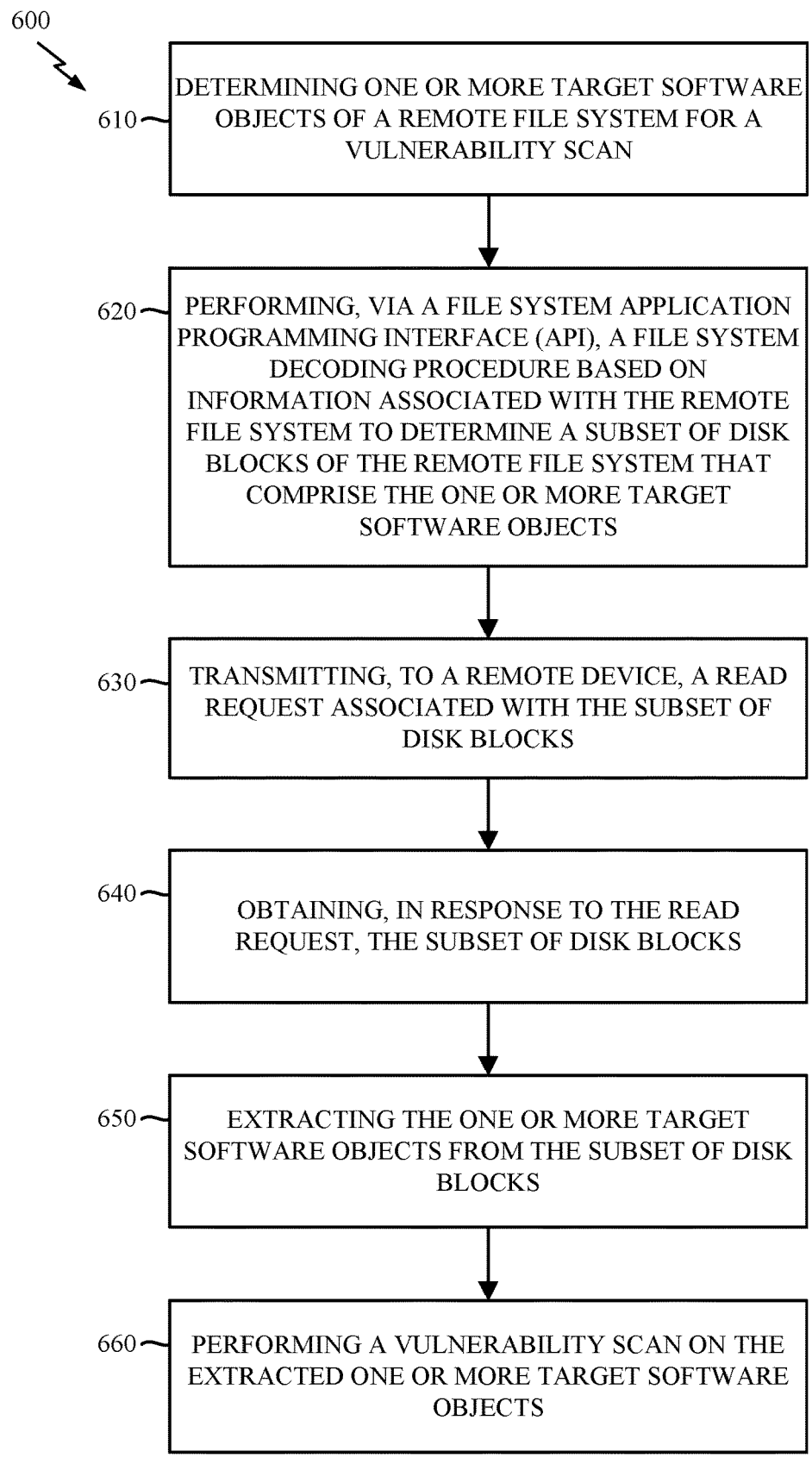
FIG. 6 illustrates a vulnerability scanning process in accordance with embodiments of the disclosure.

FIG. 6 illustrates a vulnerability scanning process 600 in accordance with embodiments of the disclosure. The vulnerability scanning process 600 of FIG. 6 may be performed by a vulnerability scanner component, such as vulnerability management system 150 or 250 (e.g., which may be implemented via a server such as server 300, a UE such as UE 400A or 400B or 400C, etc.).

Referring to FIG. 6, at 610, the vulnerability scanner component determines one or more target software objects of a remote file system for a vulnerability scan. For example, the one or more target software objects may comprise one or more file system registry files of the remote file system.

Referring to FIG. 6, at 620, the vulnerability scanner component performs, via a file system application programming interface (API), a file system decoding procedure based on information associated with the remote file system to determine a subset of disk blocks of the remote file system that comprise the one or more target software objects. For example, the remote file system may be XFS, EXT4 or NTFS. As will be described in more detail below, information characteristic of XFS-based file systems, EXT4-based or NTFS-based file systems may be used to identify the disk block(s) corresponding to software object(s) of interest via the file system decoding procedure.

For example, for XFS-based file systems, the file system decoding procedure may include determining the allocation group for a given file's inode number and then decoding the corresponding file system superblock within that allocation group. In XFS, reserved bits in each file's inode number indicate the corresponding allocation group as well as the relative offset of the file within that allocation group. Once the superblock is decoded, individual files can be read by further decoding the file's inode definition (at the relative offset in the allocation group as indicated in the file's inode number), and data extents in order to determine file offsets in the underlying data block store (e.g., AWS EBS, Azure Blob, etc.). Once the file offset is determined, a targeted read request (e.g., see 630 of FIG. 6) for a specific byte range can be made of the data block store provider (e.g., EBS Block #5). Once the specific data store blocks are read, the file system file (or directory) is available for scanning by a vulnerability scanning component.

In a further example, for EXT4-based file systems, the file system decoding procedure may include decoding the file system superblock in order to determine the offset to the file system inode table. Once the offset to the inode table is determined, a targeted read request can be made of the data block store provider (e.g., AWS EBS, Azure Blob) in order to decode the inode table and gain an understanding of the underlying files/directories contained in the filesystem. For any given file, a target read request is made using inode table information in order to retrieve and decode file data extents (e.g., direct/indirect block addressing or extent tree block addressing). The file data extent information allows follow-on targeted read requests to be made to the data store block provider in order to assemble the file contents for scanning by a vulnerability scanning component.

In a further example, for NTFS-based file systems, the file system decoding procedure may include making targeted read requests to the data store block provider (e.g., AWS EBS, Azure Blob, etc.) in order to retrieve and decode the NTFS boot section. Once the boot section is decoded, offset information can be used in order to make follow-on targeted reads to the data block store provider in order to retrieve and decode the NTFS master file table (MFT). Decoding the MFT allows specific files to be retrieved for scanning by a vulnerability scanning component, by decoding the targeted file's attributes, in order to understand the underlying data file offsets into the data store block provider.

Referring to FIG. 6, at 630, the vulnerability scanner component transmits, to a remote device, a read request associated with the subset of disk blocks. In some designs, the vulnerability scanner component is allocated read-only access to data associated with the remote file system (e.g., to satisfy a security requirement). As will be described in more detail below, the read request may be submitted to a target computer (or asset) that executes the remote file system, or alternatively to a device that is hosting a disk image of the remote file system (e.g., a cloud service such as AWS or Azure).

Referring to FIG. 6, at 640, the vulnerability scanner component obtains, in response to the read request, the subset of disk blocks. In some designs, the subset of disk blocks may be received at the vulnerability scanner component, while in other designs data structures (e.g., Blobs, EBS, etc.) containing the requested disk block(s) may be received and then translated by the vulnerability scanner component into the subset of disk blocks.

Referring to FIG. 6, at 650, the vulnerability scanner component extracts the one or more target software objects from the subset of disk blocks.

Referring to FIG. 6, at 660, the vulnerability scanner component performs the vulnerability scan on the extracted one or more target software objects.

Referring to FIG. 6, in some designs, the read request at 630 does not trigger retrieval of a disk image of the remote file system at 640. Rather, in some designs, the read request may be issued in a targeted manner so as to retrieve disk blocks comprising the software object(s) of interest only.

Referring to FIG. 6, in some designs, the vulnerability scanner component may map the subset of disk blocks to a set of cloud storage blocks associated with a cloud service that comprise the subset of disk blocks. For example, as will be described below in more detail, the mapping of the subset of disk blocks to the set of cloud storage blocks may be performed via a ReaderAt Pseudo-Device Driver. The read request at 630 may be transmitted to the cloud service, and the read request at 630 requests the set of cloud storage blocks that comprise the subset of disk blocks. In some designs, the cloud service is Amazon Web Services (AWS), and the set of cloud storage blocks is a set of Elastic Block Stores (EBSs) (e.g., described below with respect to FIG. 7). In other designs, the cloud service is Microsoft Azure, and the set of cloud storage blocks is a set of Blobs (e.g., described below with respect to FIG. 8). In other designs, the remote device corresponds to an asset that is executing the remote file system or to a device that is hosting a disk image of the remote file system, and the read request at 630 requests the subset of disk blocks (e.g., in which case the cloud service storage block mapping can be skipped, as described below with respect to FIG. 9).

As noted above with respect to FIG. 5, an instance of an OS associated with the remote file system and its corresponding block device driver may be needed at the vulnerability scanner component 502 to mount the disk image at 530 and to issue the I/O requests at 550. By contrast, in some designs, the process 600 of FIG. 6 may obviate the need for the OS instance of the remote file system and its corresponding device driver by providing a framework in which custom implementations of the well-known filesystems (e.g., XFS, EXT4 and NTFS, to name a few) can be pluggable alongside pseudo-device drivers to provide I/O to remote scan targets. In some designs, these custom file system implementations may be designed to issue I/O requests via a "ReaderAt" interface to retrieve targeted block(s) of data. In some designs, the "ReaderAt" interface may define the ability to read a specified number of bytes at a particular offset (i.e., read at). In some designs, the traditional block device driver is replaced with a pluggable software module (pseudo-device driver) that implements the "ReaderAt" interface for a targeted disk snapshot provider, as described below with respect to FIGS. 7-9.

Figure 7:
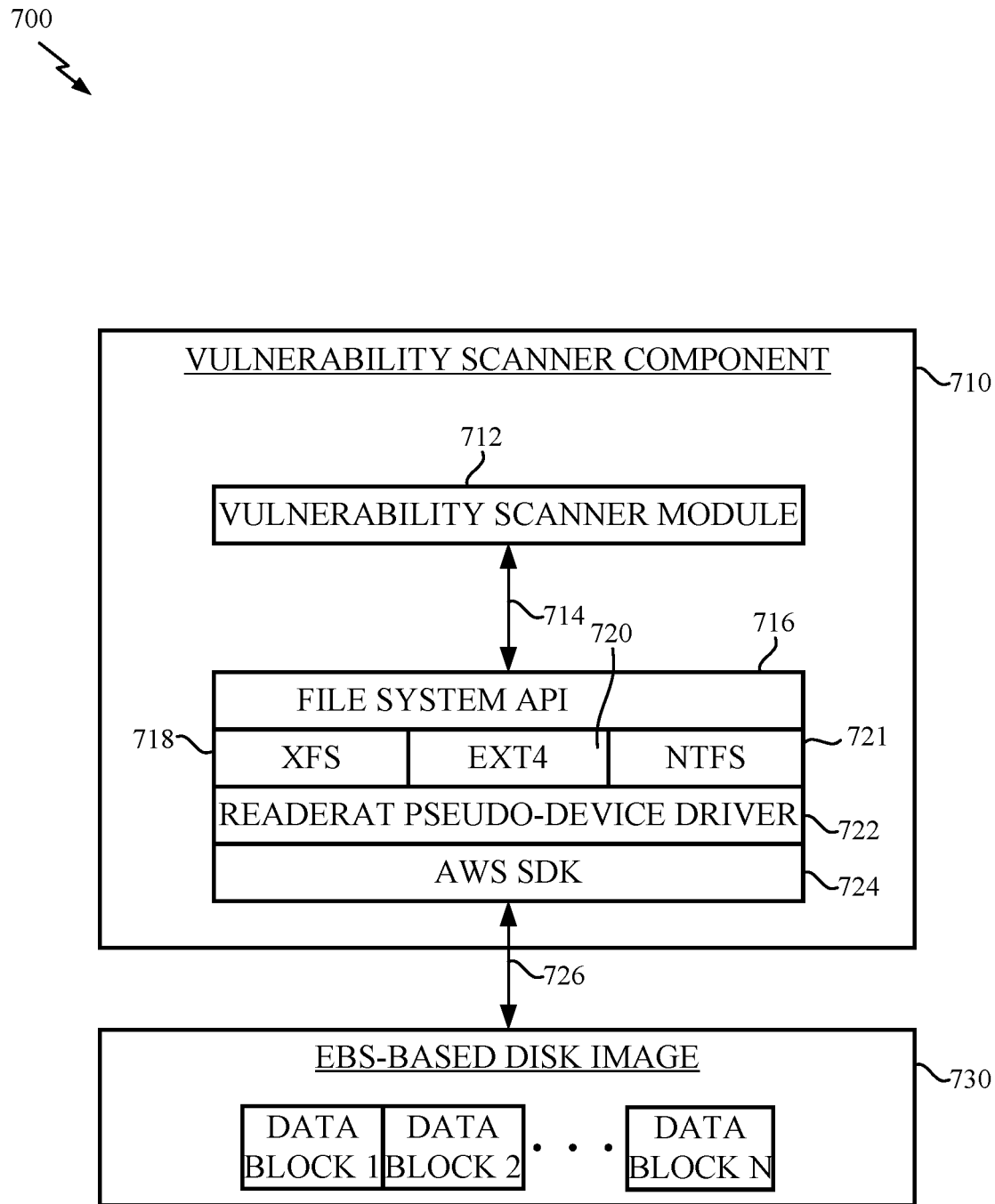
FIG. 7 illustrates an example implementation of the process of FIG. 6 in accordance with aspects of the disclosure.

FIG. 7 illustrates a configuration 700 associated with an example implementation of the process 600 of FIG. 6, according to aspects of the disclosure. In FIG. 7, a vulnerability scanner component 710 comprises a vulnerability scanner module 712, a file system API 716, an XFS module 718, an EXT4 module 720, and NTFS module 721, a ReaderAt pseudo-device driver 722 and an AWS software developer kit (SDK) module 724. In FIG. 7, an AWS component 730 comprises an EBS-based disk image of a target computer (or asset) that is made up of data blocks 1 . . . N. At 714, the vulnerability scanner module 712 and the file system API 716 may exchange lists of file(s) to scan or download, or may provide requested file(s). At 726, the ReaderAt pseudo-device driver 722 and the AWS component 730 may (remotely) exchange "read at" requests for certain EBS data block(s) and download requested EBS data block(s).

In FIG. 7, direct reading of EBS disk images in AWS can be achieved by plugging in customized EXT4/XFS/NTFS file systems alongside a ReaderAt Pseudo-Device Driver that translates read/seek requests from EXT4/XFS/NTFS modules 718-721 through the AWS SDK 724 to the corresponding EBS blocks of the EBS-based disk image. For example, if the vulnerability scanner module 712 requests to list/find/download a file from an EXT4/XFS/NTFS disk image, the vulnerability scanner module 712 simply makes an API call via 714 to the file system API 716. The customized EXT4/XFS/NTFS modules 718-721 are then capable of making "read at" requests via the ReaderAt Pseudo-Device Driver 722 in order to decode the file system and locate the requested file in the data blocks of the EBS-based disk image. Since the customized EXT4/XFS/NTFS modules 718-721 have a full understanding of the targeted file system schema (e.g., if the Azure Blob-based disk image is XFS-based then the XFS module 718 is utilized, and if the Azure Blob-based disk image is EXT4-based then the EXT4 module 720 is utilized) and the ReaderAt Pseudo-Device Driver 722 knows how to directly translate read/seek requests to specific EBS block download requests, there is no longer a requirement of mounting the targeted disk image to a host operating system for scanning. Instead, the vulnerability scanner component 710 can remotely access and scan file systems out-of-band from both the local and target operating systems. In an aspect, decoding the file system is now done directly in user mode rather than kernel mode and the target file system can remain in-place, without the need to marshal and mount the EBS-based disk image to where the vulnerability scanner component 710 is located.

In an example, the vulnerability scanner module 712 may provide a file name to the file system API 716, and the XFS module 718, EXT4 module 720 or NTFS module 721 (e.g., depending on whether the remote file system being scanned is XFS-based, EXT4-based, or NTFS-based) may decode the underlying file system superblock, inode table and file data extents in order to translate the file name into byte offset and length, and output file offset and length to the ReaderAt Pseudo-Device Driver 722. The ReaderAt Pseudo-Device Driver 722 may translate file offset and length into EBS block number, and output EBS block number to the AWS SDK 724. The AWS SDK 724 may use the EBS block number in order to transmit a read request comprising EBS block number via 726 to the AWS component 730, which looks up the targeted EBS data block(s) based on the EBS block number. The AWS component 730 transmits the targeted EBS data block(s) via 726 back to the AWS SDK 724, which translates the targeted EBS data block(s) into EBS block data, and outputs EBS block data to the ReaderAt Pseudo-Device Driver 722. The ReaderAt Pseudo-Device Driver 722 translates EBS block data into a byte buffer, and outputs the byte buffer to the XFS module 718, EXT4 module 720, or NTFS module 721 (e.g., depending on whether the remote file system being scanned is XFS-based or EXT4-based). The XFS module 718, EXT4 module 720, or the NTFS module 721 translates the byte buffer into file content, and outputs file content to the vulnerability scanner module 712. The vulnerability scanner module 712 extracts the targeted software objects (e.g., registry files, etc.) from file content, and executes the vulnerability scan on the extracted software object(s).

Figure 8:
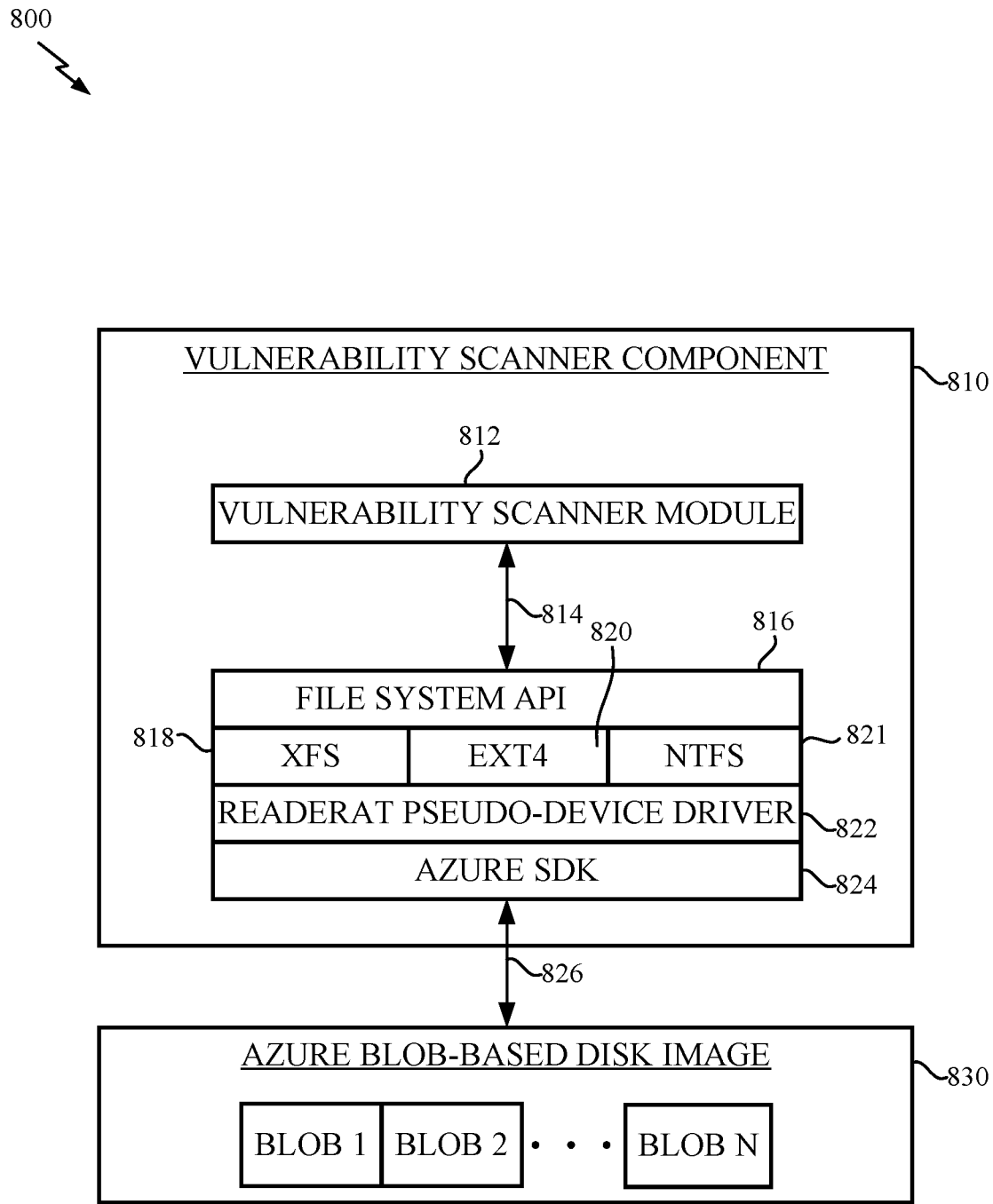
FIG. 8 illustrates an example implementation of the process of FIG. 6 in accordance with aspects of the disclosure.

FIG. 8 illustrates a configuration 800 associated with an example implementation of the process 600 of FIG. 6, according to aspects of the disclosure. In FIG. 8, a vulnerability scanner component 810 comprises a vulnerability scanner module 812, a file system API 816, an XFS module 818, an EXT4 module 820, an NTFS module 821, a ReaderAt pseudo-device driver 822 and an Azure SDK module 824. In FIG. 8, an Azure component 830 comprises a Blob-based disk image of a target computer (or asset) that is made up of Blobs 1 . . . N. At 814, the vulnerability scanner module 812 and the file system API 816 may exchange lists of file(s) to scan or download, or may provide requested file(s). At 826, the ReaderAt pseudo-device driver 822 and the Azure component 830 may (remotely) exchange "read at" requests for certain Azure Blob(s) and download requested Azure Blob(s). Except for the configuration 700 being directed to AWS and the configuration 800 being directed to Azure, the respective configurations of FIGS. 7-8 are otherwise similar such that the configuration 800 will not be described further for the sake of brevity.

In an example, the vulnerability scanner module 812 may provide a file name to the file system API 816, and the XFS module 818, EXT4 module 820, or NTFS module 821 (e.g., depending on whether the remote file system being scanned is XFS-based, EXT4-based, or NTFS-based) may decode the underlying file system superblock, inode table and file data extents in order to translate the file name into file offset and length, and output the file offset and length to the ReaderAt Pseudo-Device Driver 822. The ReaderAt Pseudo-Device Driver 822 may translate the file offset and length into blob offset and length, and output blob offset and length to the Azure SDK 824. The Azure SDK 824 may use the blob offset and length in order to transmit a read request comprising blob offset and length via 826 to the Azure component 830, which looks up the targeted Blob(s) based on blob offset and length. The Azure component 830 transmits the targeted Blob(s) via 826 back to the Azure SDK 824, which translates the targeted Blob(s) into a blob buffer, and outputs the blob buffer to the ReaderAt Pseudo-Device Driver 822. The ReaderAt Pseudo-Device Driver 822 translates the blob buffer into a byte buffer, and outputs byte buffer to the XFS module 818, EXT4 module 820, or NTFS module 821 (e.g., depending on whether the remote file system being scanned is XFS-based, EXT4-based, or NTFS-based). The XFS module 818, EXT4 module 820, or NTFS module 821 translates the byte buffer into file content, and outputs file content to the vulnerability scanner module 812. The vulnerability scanner module 812 extracts the targeted software objects (e.g., registry files, etc.) from the file content, and executes the vulnerability scan on the extracted software object(s).

Figure 9:
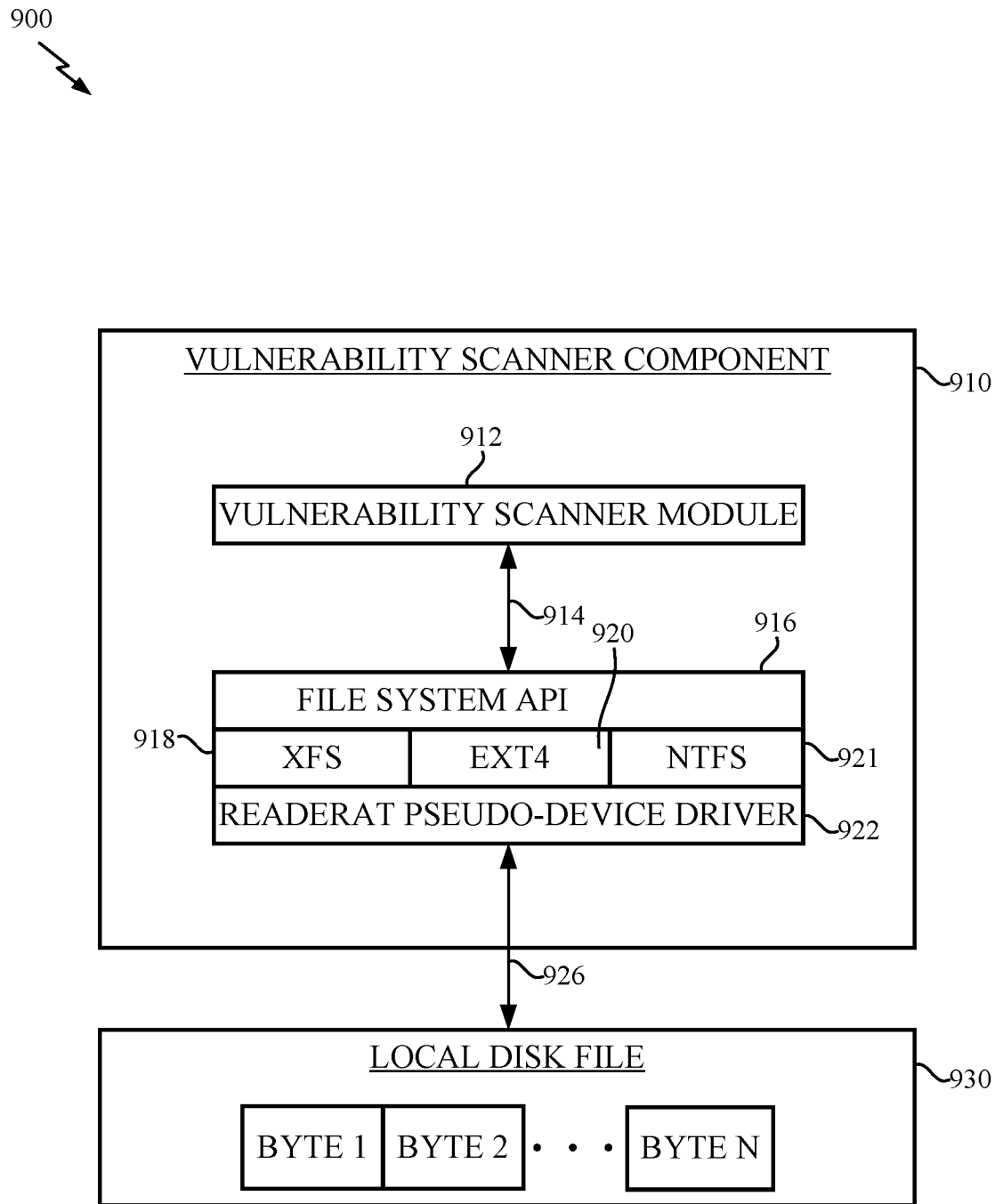
FIG. 9 illustrates an example implementation of the process of FIG. 6 in accordance with aspects of the disclosure.

FIG. 9 illustrates a configuration 900 associated with an example implementation of the process 600 of FIG. 6, according to aspects of the disclosure. In FIG. 9, a vulnerability scanner component 910 comprises a vulnerability scanner module 912, a file system API 916, an XFS module 918, an EXT4 module 920, an NTFS module 921 and a ReaderAt pseudo-device driver 922. In FIG. 9, a local disk file component 930 comprises a local disk file of a remote file system that is made up of bytes 1 . . . N. In an aspect, the local disk file may be a disk image or alternatively may be a file system that is being executed by a target computer. At 914, the vulnerability scanner module 912 and the file system API 916 may exchange lists of file(s) to scan or download, or may provide requested file(s). At 926, the ReaderAt pseudo-device driver 922 and the local disk file component 930 may (remotely) exchange "read at" requests for certain bytes and download requested bytes.

Unlike FIGS. 7-8, in an aspect, the configuration 900 can be used to read copies of disk images directly from the local file system. The "ReaderAt" Pseudo-Device Driver 922 can thereby be configured with a version that is capable of reading and seeking directly into a locally available store of bytes (e.g., a byte array representing a snapshot image file on local disk).

In an example, the vulnerability scanner module 912 may provide a file name to the file system API 916, and the XFS module 918, EXT4 module 920, or NTFS module 921 (e.g., depending on whether the remote file system being scanned is XFS-based, EXT4-based, or NTFS-based) may decode the underlying file system's superblock, inode table and file data extents in order to translate the file name into a file offset and length, and output the file offset and length to the ReaderAt Pseudo-Device Driver 922. The ReaderAt Pseudo-Device Driver 922 may translate the file offset and length into local disk offset and length, and may transmit a read request comprising local disk offset and length via 926 to the local disk file component 930, which looks up the targeted byte(s) based on local disk offset and length. The local disk file component 830 transmits the targeted byte(s) via 926 back to the ReaderAt Pseudo-Device Driver 922, which translates the targeted bytes into a byte buffer, and outputs the byte buffer to the XFS module 918, EXT4 module 920, or NTFS module 921 (e.g., depending on whether the remote file system being scanned is XFS-based, EXT4-based, or NTFS-based). The XFS module 918, EXT4 module 920, or NTFS module 921 translates the byte buffer into file content, and outputs the file content to the vulnerability scanner module 912. The vulnerability scanner module 912 extracts the targeted software objects (e.g., registry files, etc.) from the file content, and executes the vulnerability scan on the extracted software object(s).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a vulnerability scanner component, comprising: determining one or more target software objects of a remote file system for a vulnerability scan; performing, via a file system application programming interface (API), a file system decoding procedure based on information associated with the remote file system to determine a subset of disk blocks of the remote file system that comprise the one or more target software objects; transmitting, to a remote device, a read request associated with the subset of disk blocks; obtaining, in response to the read request, the subset of disk blocks; extracting the one or more target software objects from the subset of disk blocks; and performing the vulnerability scan on the extracted one or more target software objects.

Clause 2. The method of clause 1, wherein the remote device corresponds to an asset that is executing the remote file system or to a device that is hosting a disk image of the remote file system, and wherein the read request requests the subset of disk blocks.

Clause 3. The method of any of clauses 1 to 2, further comprising: mapping the subset of disk blocks to a set of cloud storage blocks associated with a cloud service that comprise the subset of disk blocks, wherein the read request is transmitted to the cloud service, and wherein the read request requests the set of cloud storage blocks that comprise the subset of disk blocks.

Clause 4. The method of clause 3, wherein the cloud service is Amazon Web Services (AWS), and the set of cloud storage blocks is a set of Elastic Block Stores (EBSs), or wherein the cloud service is Microsoft Azure, and the set of cloud storage blocks is a set of Blobs.

Clause 5. The method of any of clauses 1 to 4, wherein the vulnerability scanner component is allocated read-only access to data associated with the remote file system.

Clause 6. The method of any of clauses 1 to 5, wherein the one or more target software objects comprise one or more file system registry files of the remote file system.

Clause 7. The method of any of clauses 1 to 6, wherein the read request does not trigger retrieval of a disk image of the remote file system.

Clause 8. The method of any of clauses 1 to 7, wherein the remote file system is an X-Methods file system (XFS), extension 4 (EXT4) or New Technology File System (NTFS).

Clause 9. A vulnerability scanner component, comprising: a memory; and at least one processor communicatively coupled to the memory, the at least one processor configured to: determine one or more target software objects of a remote file system for a vulnerability scan; perform, via a file system application programming interface (API), a file system decoding procedure based on information associated with the remote file system to determine a subset of disk blocks of the remote file system that comprise the one or more target software objects; transmit, to a remote device, a read request associated with the subset of disk blocks; obtain, in response to the read request, the subset of disk blocks; extract the one or more target software objects from the subset of disk blocks; and perform the vulnerability scan on the extracted one or more target software objects.

Clause 10. The vulnerability scanner component of clause 9, wherein the remote device corresponds to an asset that is executing the remote file system or to a device that is hosting a disk image of the remote file system, and wherein the read request requests the subset of disk blocks.

Clause 11. The vulnerability scanner component of any of clauses 9 to 10, wherein the at least one processor is further configured to: map the subset of disk blocks to a set of cloud storage blocks associated with a cloud service that comprise the subset of disk blocks, wherein the read request is transmitted to the cloud service, and wherein the read request requests the set of cloud storage blocks that comprise the subset of disk blocks.

Clause 12. The vulnerability scanner component of clause 11, wherein the cloud service is Amazon Web Services (AWS), and the set of cloud storage blocks is a set of Elastic Block Stores (EBSs), or wherein the cloud service is Microsoft Azure, and the set of cloud storage blocks is a set of Blobs.

Clause 13. The vulnerability scanner component of any of clauses 9 to 12, wherein the vulnerability scanner component is allocated read-only access to data associated with the remote file system.

Clause 14. The vulnerability scanner component of any of clauses 9 to 13, wherein the one or more target software objects comprise one or more file system registry files of the remote file system.

Clause 15. The vulnerability scanner component of any of clauses 9 to 14, wherein the read request does not trigger retrieval of a disk image of the remote file system.

Clause 16. The vulnerability scanner component of any of clauses 9 to 15, wherein the remote file system is an X-Methods file system (XFS), extension 4 (EXT4) or New Technology File System (NTFS).

Clause 17. A non-transitory computer-readable medium storing computer-executable instructions that, when executed by a vulnerability scanner component, cause the vulnerability scanner component to: determine one or more target software objects of a remote file system for a vulnerability scan; perform, via a file system application programming interface (API), a file system decoding procedure based on information associated with the remote file system to determine a subset of disk blocks of the remote file system that comprise the one or more target software objects; transmit, to a remote device, a read request associated with the subset of disk blocks; obtain, in response to the read request, the subset of disk blocks; extract the one or more target software objects from the subset of disk blocks; and perform the vulnerability scan on the extracted one or more target software objects.

Clause 18. The non-transitory computer-readable medium of clause 17, wherein the remote device corresponds to an asset that is executing the remote file system or to a device that is hosting a disk image of the remote file system, and wherein the read request requests the subset of disk blocks.

Clause 19. The non-transitory computer-readable medium of any of clauses 17 to 18, further comprising computer-executable instructions that, when executed by the vulnerability scanner component, cause the vulnerability scanner component to: map the subset of disk blocks to a set of cloud storage blocks associated with a cloud service that comprise the subset of disk blocks, wherein the read request is transmitted to the cloud service, and wherein the read request requests the set of cloud storage blocks that comprise the subset of disk blocks.

Clause 20. The non-transitory computer-readable medium of clause 19, wherein the cloud service is Amazon Web Services (AWS), and the set of cloud storage blocks is a set of Elastic Block Stores (EBSs), or wherein the cloud service is Microsoft Azure, and the set of cloud storage blocks is a set of Blobs.

Clause 21. The non-transitory computer-readable medium of any of clauses 17 to 20, wherein the vulnerability scanner component is allocated read-only access to data associated with the remote file system.

Clause 22. The non-transitory computer-readable medium of any of clauses 17 to 21, wherein the one or more target software objects comprise one or more file system registry files of the remote file system.

Clause 23. The non-transitory computer-readable medium of any of clauses 17 to 22, wherein the read request does not trigger retrieval of a disk image of the remote file system.

Clause 24. The non-transitory computer-readable medium of any of clauses 17 to 23, wherein the remote file system is an X-Methods file system (XFS), extension 4 (EXT4) or New Technology File System (NTFS).

Clause 25. An apparatus comprising means for performing a method according to any of clauses 1 to 8.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of operating a vulnerability scanner component, comprising:
   determining one or more target software objects of a remote file system for a vulnerability scan;
   performing, via a file system application programming interface (API) based on information associated with the remote file system to determine a subset of disk blocks of the remote file system that comprises the one or more target software objects;
   mapping the subset of disk blocks to a set of storage blocks that comprises the subset of disk blocks;
   transmitting, to a remote device, a read request that requests the set of storage blocks that comprises the subset of disk blocks;
   obtaining, in response to the read request, the subset of disk blocks;
   extracting the one or more target software objects from the subset of disk blocks; and
   performing the vulnerability scan on the extracted one or more target software objects.

2. The method of claim 1,
   wherein the remote device corresponds to an asset that is executing the remote file system or to a device that is hosting a disk image of the remote file system, and
   wherein the read request requests the subset of disk blocks.

3. The method of claim 1,
wherein the read request is transmitted to Amazon Web Services (AWS), and the set of storage blocks is a set of Elastic Block Stores (EBSs), or
wherein the read request is transmitted to Microsoft Azure, and the set of storage blocks is a set of Blobs.

4. The method of claim 1, wherein the vulnerability scanner component is allocated read-only access to data associated with the remote file system.

5. The method of claim 1, wherein the one or more target software objects comprise one or more file system registry files of the remote file system.

6. The method of claim 1, wherein the read request does not trigger retrieval of a disk image of the remote file system.

7. The method of claim 1, wherein the remote file system is an X-Methods file system (XFS), extension 4 (EXT4) or New Technology File System (NTFS).

8. A vulnerability scanner component, comprising:
one or more memories;
one or more transceivers; and
one or more processors communicatively coupled to the one or more memories and the one or more transceivers, the one or more processors, either alone or in combination, configured to:
determine one or more target software objects of a remote file system for a vulnerability scan;
perform, via a file system application programming interface (API) based on information associated with the remote file system to determine a subset of disk blocks of the remote file system that comprises the one or more target software objects;
map the subset of disk blocks to a set of storage blocks that comprises the subset of disk blocks;
transmit, via the one or more transceivers, to a remote device, a read request that requests the set of storage blocks that comprises the subset of disk blocks;
obtain, in response to the read request, the subset of disk blocks;
extract the one or more target software objects from the subset of disk blocks; and
perform the vulnerability scan on the extracted one or more target software objects.

9. The vulnerability scanner component of claim 8,
wherein the remote device corresponds to an asset that is executing the remote file system or to a device that is hosting a disk image of the remote file system, and
wherein the read request requests the subset of disk blocks.

10. The vulnerability scanner component of claim 8,
wherein the read request is transmitted to Amazon Web Services (AWS), and the set of storage blocks is a set of Elastic Block Stores (EBSs), or
wherein the read request is transmitted to Microsoft Azure, and the set of storage blocks is a set of Blobs.

11. The vulnerability scanner component of claim 8, wherein the vulnerability scanner component is allocated read-only access to data associated with the remote file system.

12. The vulnerability scanner component of claim 8, wherein the one or more target software objects comprise one or more file system registry files of the remote file system.

13. The vulnerability scanner component of claim 8, wherein the read request does not trigger retrieval of a disk image of the remote file system.

14. The vulnerability scanner component of claim 8, wherein the remote file system is an X-Methods file system (XFS), extension 4 (EXT4) or New Technology File System (NTFS).

15. A vulnerability scanner component, comprising:
means for determining one or more target software objects of a remote file system for a vulnerability scan;
means for performing, via a file system application programming interface (API) based on information associated with the remote file system to determine a subset of disk blocks of the remote file system that comprises the one or more target software objects;
means for mapping the subset of disk blocks to a set of storage blocks that comprises the subset of disk blocks;
means for transmitting, to a remote device, a read request that requests the set of storage blocks that comprises the subset of disk blocks;
means for obtaining, in response to the read request, the subset of disk blocks;
means for extracting the one or more target software objects from the subset of disk blocks; and
means for performing the vulnerability scan on the extracted one or more target software objects.

16. The vulnerability scanner component of claim 15,
wherein the remote device corresponds to an asset that is executing the remote file system or to a device that is hosting a disk image of the remote file system, and
wherein the read request requests the subset of disk blocks.

17. The vulnerability scanner component of claim 15,
wherein the read request is transmitted to Amazon Web Services (AWS), and the set of storage blocks is a set of Elastic Block Stores (EBSs), or
wherein the read request is transmitted to Microsoft Azure, and the set of storage blocks is a set of Blobs.

18. The vulnerability scanner component of claim 15, wherein the vulnerability scanner component is allocated read-only access to data associated with the remote file system.

19. The vulnerability scanner component of claim 15, wherein the one or more target software objects comprise one or more file system registry files of the remote file system.

20. The vulnerability scanner component of claim 15, wherein the read request does not trigger retrieval of a disk image of the remote file system.

21. The vulnerability scanner component of claim 15, wherein the remote file system is an X-Methods file system (XFS), extension 4 (EXT4) or New Technology File System (NTFS).

22. A non-transitory computer-readable medium storing computer-executable instructions that, when executed by a vulnerability scanner component, cause the vulnerability scanner component to:
determine one or more target software objects of a remote file system for a vulnerability scan;
perform, via a file system application programming interface (API) based on information associated with the remote file system to determine a subset of disk blocks of the remote file system that comprises the one or more target software objects;
map the subset of disk blocks to a set of storage blocks that comprises the subset of disk blocks;
transmit, to a remote device, a read request that requests the set of storage blocks that comprises the subset of disk blocks;

obtain, in response to the read request, the subset of disk blocks;

extract the one or more target software objects from the subset of disk blocks; and perform the vulnerability scan on the extracted one or more target software objects.

23. The non-transitory computer-readable medium of claim 22, wherein the remote device corresponds to an asset that is executing the remote file system or to a device that is hosting a disk image of the remote file system, and wherein the read request requests the subset of disk blocks.

24. The non-transitory computer-readable medium of claim 22, wherein the read request is transmitted to Amazon Web Services (AWS), and the set of storage blocks is a set of Elastic Block Stores (EBSs), or wherein the read request is transmitted to Microsoft Azure, and the set of storage blocks is a set of Blobs.

25. The non-transitory computer-readable medium of claim 22, wherein the vulnerability scanner component is allocated read-only access to data associated with the remote file system.

26. The non-transitory computer-readable medium of claim 22, wherein the one or more target software objects comprise one or more file system registry files of the remote file system.

27. The non-transitory computer-readable medium of claim 22, wherein the read request does not trigger retrieval of a disk image of the remote file system.

28. The non-transitory computer-readable medium of claim 22, wherein the remote file system is an X-Methods file system (XFS), extension 4 (EXT4) or New Technology File System (NTFS).

* * * * *